F. SCHREIDT.
PACKLESS VALVE.
APPLICATION FILED APR. 12, 1911.
1,054,623.
Patented Feb. 25, 1913.
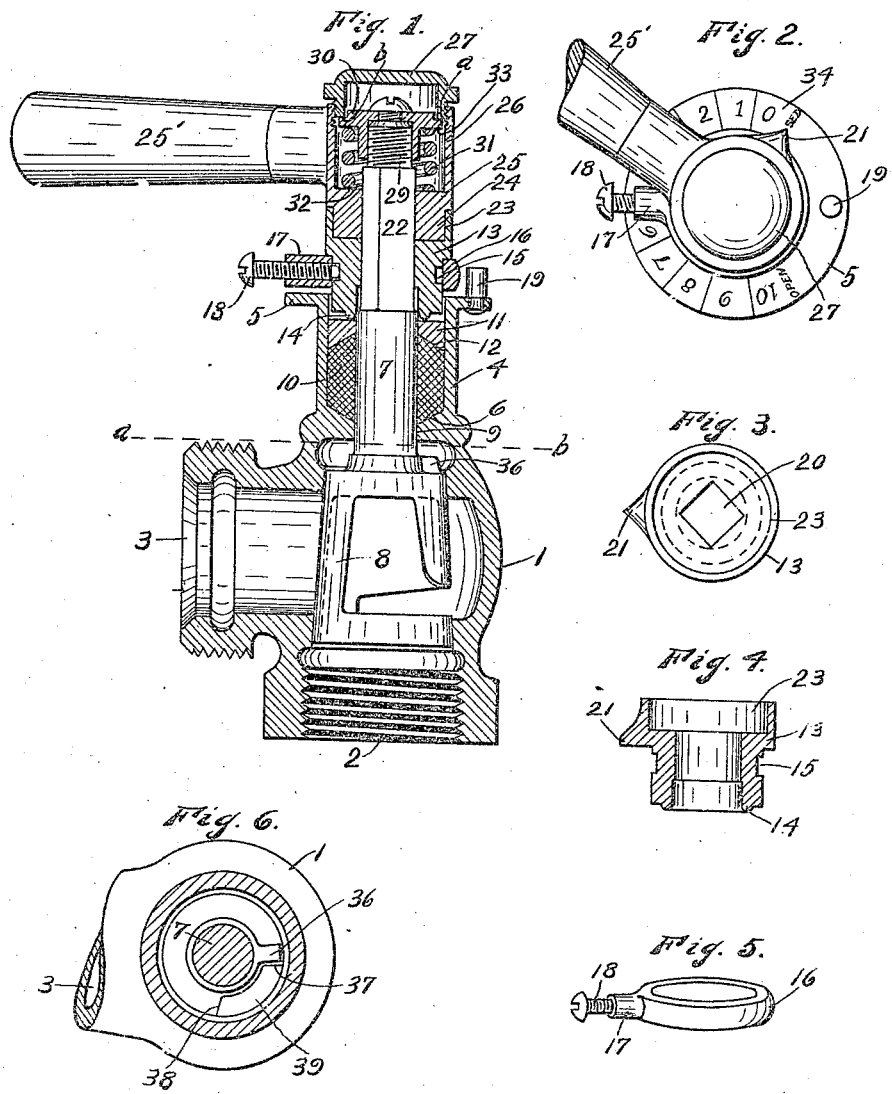

UNITED STATES PATENT OFFICE.

FRANK SCHREIDT, OF MANSFIELD, OHIO.

PACKLESS VALVE.

1,054,623. Specification of Letters Patent. Patented Feb. 25, 1913.

Application filed April 12, 1911. Serial No. 620,571.

*To all whom it may concern:*

Be it known that I, FRANK SCHREIDT, a citizen of the United States of America, residing at Mansfield, in the county of Richland and State of Ohio, have invented certain new and useful Improvements in Packless Valves, of which the following is a specification.

My invention relates to packless radiator valves.

The objects of my invention are; to provide means of rotatably suspending a valve stem; to provide means of forcing a soft packing in close contact with the valve stem to prevent leakage past the stem; to provide means of automatically taking up the wear of the parts and packing; to provide means of setting the valve to open more or less and to prevent the further opening of the valve when the valve is opened a predetermined amount; and to provide means of releasing the valve from its seat in case of sticking.

In the drawings, Figure 1 represents a cross-sectional side elevation of my valve showing it in closed position. Fig. 2 represents a top view of the indicator part of the operating handle, cap, regulator ring and stop. Fig. 3 is a top view of a connecting member provided with a rectangular aperture and a pointer. Fig. 4 is a cross sectional side elevation of Fig. 3. Fig. 5 shows the regulator ring having a boss that contacts with a stop pin. Fig. 6 is a bottom view of Fig. 1 taken on the lines *a—b*, showing projecting portion on the valve stem which stops the rotation of the stem and valve when the valve is fully closed or fully open.

In the drawings, reference numeral 1 represents the body of the valve, 2 the inlet and 3 the outlet thereof. A bonnet 4 is preferably made integral with the body but of course can be threadably connected thereto if desired. The bonnet is provided with an outwardly extending annular flange 5 and the inner periphery of the bonnet is provided with an annular seat 6.

The valve stem 7 carries a valve 8 at its lower end and is inserted in an aperture 9 formed contiguous with the seat 6. Soft packing 10 made of any flexible material tapered on its lower portion to fit the seat 6 is provided and surrounds the valve stem 7. A loose ring 11 having a tapered seat 12 formed on its lower surface is fitted to surround the valve stem and lie in contact with the tapered top portion of the soft packing 10. A connecting member 13 is provided with an annular rib 14 and is adapted to rest upon the ring 11. The connecting member 13 has an annular groove 15 formed on its outer periphery. A regulator ring 16 is fitted to the outer periphery of the connecting member 13 having an outwardly extending boss 17 interiorly threaded to engage with the set screw 18 which is adapted to enter the groove 15 to maintain and adjust the regulator ring. After adjustment, the size of the opening of the valve is regulated to be opened uniformly by the stop 19.

It will be observed that when the regulator ring is adjusted, the boss 17 will contact with the stop 19 which prevents its further rotation and maintains the predetermined size of the opening uniformly until further adjustment of the regulator is desirable.

It will be noted that the connecting member is provided with a rectangular aperture 20 and a pointer 21. The rectangular aperture fits over the rectangular portion 22 of the valve stem 7 so that when movement is imparted to the valve stem it also imparts movement to the connecting member, the valve stem and valve.

The upper portion of the connecting member 13 is cupped at 23 to fit the reduced end 24 of the body portion 25 of the operating lever 25'. The portion 25 of the operating lever is also cupped at 26 and interiorly threaded to engage with the adjustable cap 27, the annular flange (*a*) of which is adapted to contact with the shouldered portion (*b*) of the valve holder 30 and when the valve sticks and the cap is screwed against the valve holder it forces the valve from its seat releasing it.

In order to suspend the valve stem 7 and hold the valve 8 in contact with its seat and also to force the soft packing 10 in close contact with the valve stem 7, the end of the valve stem 7 is provided with a threaded portion 29. A cup shaped holder 30, interiorly screw-threaded, is provided and threadably engages the threaded end 29 of the valve stem for adjusting the valve stem to force the valve in close contact with its seat. Normally the cap 27 is retracted to allow the springs to force the valve to its seat.

A coil compression spring 31 rests upon the shoulder 32 of the cup portion 26 of the body of the operating lever and exerts a pressure against the under surface of an outwardly extending annular flange 33 of the holder. The pressure of the spring against the flange 33 normally forces the valve stem in an upward direction and the valve in close and yielding contact with its seat automatically taking up the wear of the valve and its seat and forces the soft packing, as it wears, in contact with the stem to prevent leakage past the stem. It will also be observed that the valve holder is adjustable and can be manually screwed down against the tension of the coil spring 31 forcing the connecting member 13 to force the loose ring 11 in contact with the soft packing 10 making it fit snugly around the stem.

The outwardly extending flange 5 of the bonnet has numerals embossed on the surface 34 to indicate the extent of the opening of the valve 8 and the pointer 21 points to the number desired and the boss of the regulating ring is then set to contact with the stop when the size of the opening desired is determined. In setting the valve to increase or decrease the size of the opening of the valve, the set screw 18 is loosened and the regulator ring moved in the direction desired to regulate the flow of the fluid through the valve 8.

A stop 36 is provided to indicate that the valve is completely closed or opened. The stop contacts with each end 37 and 38 of a segment 39.

What I claim is:

1. A valve comprising a body portion and an integral bonnet, a valve stem carrying a valve, an operating lever provided with a body having a hollow portion and a shoulder formed in one end, connecting means to rotatably connect said operating lever to the bonnet of the valve, a cap to adjustably engage the cup portion of the operating lever and adapted to bear upon the valve holder to adjustably regulate the contact of the valve with its seat, as described and set forth.

2. A valve comprising a body portion and a bonnet, a valve stem carrying a valve, an operating lever provided with a body having a hollow portion and a shoulder formed in one end, connecting means to rotatably connect said operating lever to the bonnet of the valve, suspending means to support said valve and stem, said operating lever being provided with a rectangular aperture to engage the rectangular end of the valve stem whereby the position of the operating lever may be changed with respect to the stem.

3. A valve comprising a body portion and a bonnet, a valve stem, an operating lever having a body provided with a central orifice in the upper portion and a smaller concentric orifice in the lower portion forming a shoulder, a valve stem holder adjustably connected to the end of the valve stem, yielding means interposed between the valve holder and shouldered portion to automatically take up the wear of the parts.

4. A valve comprising a body portion and a bonnet, a valve stem, an operating lever having a body provided with a central orifice in the upper portion and a smaller concentric orifice in the lower portion forming a shoulder, a valve stem holder adjustably connected to the end of the valve stem, yielding means interposed between the valve holder and shouldered portion to automatically take up the wear, soft packing fitted around said valve stem and means to force said packing in close contact with the stem to prevent leakage past the stem.

5. A valve comprising a body portion and a bonnet, a valve stem, an operating lever having a body provided with a central orifice in the upper portion and a smaller concentric orifice in the lower portion forming a shoulder, a valve stem holder adjustably connected to the end of the valve stem, yielding means interposed between the valve holder and shouldered portion to automatically take up the wear, soft packing fitted around said stem, a loose ring supported by said packing and automatic means to keep the soft packing in close contact with the stem.

6. A valve comprising a body portion and a bonnet, a valve stem, an operating lever having a body provided with a central orifice in the upper portion and a smaller concentric orifice in the lower portion forming a shoulder, a valve stem holder adjustably connected to the end of the valve stem, soft packing fitted around said stem, yielding means interposed between the valve holder and shouldered portion to automatically take up the wear of the parts and packing.

7. A valve comprising a body portion and a bonnet, a valve stem, an operating lever having a body provided with a central orifice in the upper portion and a smaller concentric orifice in the lower portion forming a shoulder, a valve holder adjustably connected to the end of the valve stem, yielding means interposed between the valve holder and shouldered portion, a cap to threadably engage the large orifice formed in the body of the operating lever and contact with the valve holder to release the valve from its seat in case of sticking.

8. The combination of a valve, a valve stem, a valve stem holder with soft packing adapted to surround the stem, means to suspend the stem and provide for automatic adjustment of the parts for wear; said means being also adapted to exert a pressure against the soft packing to automatically keep the packing in close contact with the stem, an operating lever, an intermediate member interposed between the operating lever and a ring which is in contact with the soft packing, and a regulator ring carried by said intermediate member and adapted to regulate the size of the opening of the valve, as described and set forth.

9. A valve comprising a body portion and a bonnet, a valve stem, an operating lever provided with a hollow body portion, a valve stem holder adjustably connected to the end of the valve stem, soft packing fitted around said stem, a connecting member, a ring fitted to the outer periphery of the connecting member and adapted to be adjusted thereon to regulate the size of the opening.

10. A valve comprising a body portion and a bonnet, a valve stem, an operating lever provided with a hollow body portion, a valve stem holder adjustably connected to the end of the valve stem, soft packing fitted around said stem, yielding means interposed between the valve holder and shoulder of the operating handle to automatically take up the wear of the parts and packing, a connecting member interposed between the operating handle and soft packing, a ring fitted to the outer periphery of the connecting member and adapted to be adjusted thereon, an outwardly extending flange provided on the bonnet of the valve having numerals thereon to indicate the extent of the opening of the valve.

11. A valve comprising a body portion and a bonnet, a valve stem, an operating lever provided with a hollow body portion, a valve stem holder adjustably connected to the end of the valve stem, soft packing fitted around said stem, yielding means interposed between the valve holder and shoulder of the operating handle to automatically take up the wear of the parts and packing, a connecting member interposed between the operating handle and soft packing, a ring fitted to the outer periphery of the connecting member and adapted to be adjusted thereon, a stop extending from the valve stem and adapted to stop the rotation of the valve stem when the valve is fully opened or closed.

In testimony whereof I affix my signature in presence of two witnesses.

FRANK SCHREIDT.

Witnesses:
 JOHN H. COSS,
 CLARA HERRING.